Patented Oct. 4, 1932

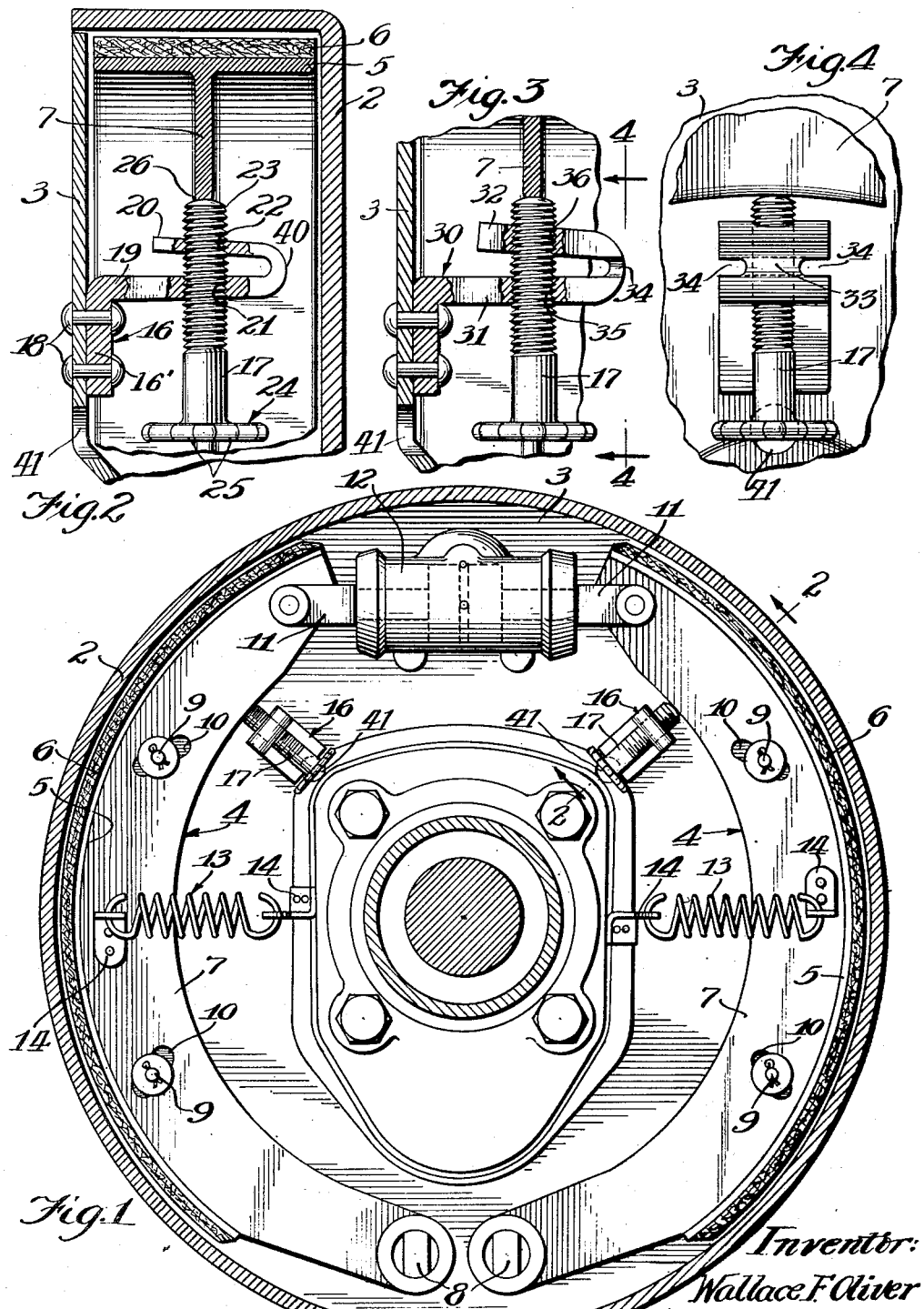

1,881,238

UNITED STATES PATENT OFFICE

WALLACE F. OLIVER, OF DETROIT, MICHIGAN, ASSIGNOR TO HYDRAULIC BRAKE COMPANY, OF DETROIT, MICHIGAN, A CORPORATION OF CALIFORNIA

BRAKE MECHANISM

Application filed November 26, 1930. Serial No. 498,211.

This invention relates to braking apparatus and is herein shown and described as applied to automobiles and particularly to braking apparatus of the fluid pressure operated type.

An object of my invention is the provision of means for limiting the retractile movement of the brake shoes to compensate for the wear of the brake surfaces so that the brake operating mechanism retracts through substantially the same distance, that is, means are provided for adjusting a brake shoe stop so that the brake shoe is retracted the same amount after it becomes worn as when it is new.

Another object of the invention is to provide an adjustable stop for the brake shoes which may be adjusted without disassembling the brake mechanism.

Another object of the invention is to provide a stop in the form of an adjustable screw conveniently located in an accessible portion of the brake housing which may be adjusted through the agency of a suitable tool for rotating the screw.

A further object of my invention is the provision of a bracket in which the stop is adjustably supported and having resilient means for maintaining the stop screw in adjusted position.

A further object of the invention is the provision of means integral with the bracket which supports the adjustable screw stop for securing the same in an adjusted position without the aid of the usual lock nuts or the like.

A still further object of the invention is the provision of means integral with the bracket which supports the adjustable screw stop for frictionally engaging the stop screw to prevent rotation of the same under vibration occurring in the vehicle wheel.

A still further object of the invention is to provide a stop mechanism of this character which is of simple and an inexpensive nature and of a compact, strong and durable construction, comprising few parts which can be easily assembled and cheaply and economically manufactured.

The novel features through the provision of which the above-mentioned and other advantageous results are attained, will be explained by reference to the accompanying drawing in which several embodiments of my invention are shown and in which Fig. 1 is a front elevation partly in section of a brake assembly embodying my invention;

Fig. 2 is a cross-sectional view of the apparatus taken on the line 2—2 of Fig. 1;

Fig. 3 is a cross-sectional view similar to Fig. 2, showing a modified form of bracket support for the adjustable stop member; and Fig. 4 is a right side view of Fig. 3.

Referring to the drawing, the invention is illustrated in connection with a hydraulic brake of the internal type in which a drum 2, which is attached to the vehicle wheel or other rotatable member (not shown), surrounds the operating parts of the brake mechanism and is mounted upon a pan or backing plate 3.

A pair of brake shoes 4, each comprising an arcuate section 5, is provided with a brake lining 6, and an inwardly projecting flange 7 is pivotally mounted upon an anchor pin 8 attached to the lower portion of the backing plate 3. A plurality of shouldered guide and spacer pins 9 carried by the plate 3 project through slots 10 in the flange 7 to guide the movement of the brake shoes 4 and hold them in properly spaced relation with the plate 3 to prevent contacting therewith. The brake shoes 4 are arranged to engage with the drum 2 by a pair of fluid pressure operated pistons 11 which are actuated by the fluid pressure within the cylinder 12, and upon the reduction of fluid pressure within the cylinder 12 the brake shoes 4 are returned to their normal or inoperative position by the springs 13, the opposite ends of which are secured to the brackets 14 secured respectively to the flange 7 of the brake shoes 4 and the backing plate 3.

A stop mechanism is provided to limit the return or retractile movement of the brake shoes 4 so that as the lining 6 becomes worn and a greater movement of the brake shoes toward the drum 2 is required, the retractile movement can be correspondingly decreased so as to maintain a constant clearance between the brake shoes 4 and the drum 2 when the brake shoes are in their normal or inoperative position, resulting in a uniform stroke of the fluid operated pistons 11 in the cylinders 12.

The stop mechanism of my invention comprises an L-shaped bracket member indicated generally by the reference character 16, which is rigidly secured by its base 16' to the backing plate 3 by the rivets 18 and supports an adjustable screw stop 17. The bracket member 16 includes a laterally extending arm 19 which is of sufficient length to be bent backwards upon itself by means of a return or connecting bend 40 to provide the arm 19 with a spaced depending tongue 20 disposed at a slight angle relative to the plane of the arm 19.

The arm 19 and its integrally formed tongue 20 are drilled and tapped to provide tapped openings 21 and 22, which, when the tongue 20 is forced in parallel relation with the arm 19, are in axial alignment for the reception of the screw stop 17. The connecting bend 40 is flexed when the tongue 20 is forced into parallel relation with the arm 19 and places the tongue 20 under tension, and this tension, when the screw stop 17 is in threaded engagement with the tapped openings 21 and 22, tends to move the tongue 20, and the force thus exerted produces a frictional or binding effect between the threads of the tapped openings 21 and 22 and the threads of the screw stop 17 and is sufficient to prevent rotation of the screw stop 17 under vibration occurring in the vehicle wheel but not with sufficient force to prevent rotation of the same for adjustment purposes.

The brackets 16 are rigidly secured upon the backing plate 3 with their major axes at substantially right angles to the flanges 7 and adjacent the upper extremities of the brake shoes 4. As shown in Fig. 2, the laterally extending arm 19 is of such thickness as to form a substantially rigid member which will not be affected by vibrations occurring in the vehicle wheel nor by the vibrations which may be transmitted to it through the screw stop 17 by the brake shoe 4. Due to this rigid construction of the arm 19, it is always maintained in fixed position, preventing any movement of the screw stop relative to the brake shoes 4. While I have shown the arm 19 of the bracket 16 of rigid construction, it is to be understood that the bracket 16 may be provided with a less rigid member 19 when such brake construction permits.

The screw stop 17 is provided with a head 24, the peripheral edge of which is notched as shown at 25. The notched head 25 may be engaged by means of a screw-driver or similar tool inserted through an opening 41 in the backing plate 3. This opening 41 is positioned in the backing plate 3 adjacent the notched head 24 and permits the insertion of a suitable tool from the outside of the brake housing for engagement with the head 24 whereby the screw stop 17 may be rotated in a clockwise or counter-clockwise direction to adjust the end 26 of the stop 17 relative to the flange 7 of the brake shoe 4 to determine the retracted position of the brake 4.

In the retracted or normal position the flanges 7 of the respective brake shoes 4 engage the ends of the adjustable screw stops 17 associated with the right and left-hand brake shoes 4 to limit the retractile or return movement of the same. As the lining 6 becomes worn a greater movement of the brake shoes toward the drum 2 is required and the retractile movement of the same can be correspondingly decreased by rotating the respective screw stops 17 against the force which frictionally holds them in adjusted position until the proper adjustment is obtained. The insertion of a suitable tool through the openings 41 in the back plate 3 adjacent the heads 24 of the screw stops 17 for engagement with the notched heads of the same is the only requirement necessary for adjusting the stops 17. When thus adjusted they are maintained in adjustment by the frictional or binding engagement between the screw threads of the screw stop 17 and the screw threads in the respective tapped openings in the member 19 and arm 20.

The stop 17 thus provides a simple and convenient means for adjusting the amount of movement of the brake shoes 4 of a brake mechanism of the internal brake type without the necessity of removing the vehicle wheel or disassembling the brake mechanism which is necessary in many types of stop mechanism. All that is required to adjust the stop mechanism is to adjust the screw stop 17 accessibly located in the brake housing and from the exterior of the same. The adjustable stop of my invention also eliminates the usual lock nuts or other locking devices used for maintaining the stops in their adjusted positions, doing away with the usual operation of "slacking off" the lock nuts to permit adjustment of the stop and the subsequent locking of the stop in its adjusted position by means of these lock nuts.

Referring now to Figs. 3 and 4, I illustrate therein a modified form of bracket for adjustably supporting the screw stop 17. The bracket 30, as shown, is similar in form to that illustrated in Fig. 2 but in this bracket the laterally extending rigid member 31 and depending arm 32 are of the same thickness and are joined together by the connecting bend or shank 33. The thickness of the shank 33 is considerably less than that of the member 31 and arm 32 and diametrically opposite notches 34 in the respective edges of the shank 33 in combination therewith provide a resilient shank 33. The member 31 and arm 32 are drilled and tapped to provide tapped openings 35 and 36 in the respective member 31 and arm 32, which, when the arm 32 is placed in parallel relation with the member 31, are in axial alignment for the reception of the adjustable screw stop 17. The resilient shank 33 places the arm 32 under tension when moved into parallel relation with the member 31 and this tension in the arm 32 produces a frictional or binding effect between the threads of the tapped openings 35 and 36 and the threads of the screw stop 17 to prevent rotation of the same under vibration occurring in the vehicle wheel.

Having thus described my invention, what I claim as new and desire to secure by United States Letters Patent is:

1. In a brake mechanism, a brake drum, a stationary support forming a housing with said drum, a brake shoe carried by said support and adapted to be moved into contact with said drum, an adjustable screw stop for said brake, a bracket supporting said stop rigidly secured to said support, a rigid laterally extending arm on said bracket and means integral therewith having tapped openings therein for the reception of said stop, and connecting means between said arm and said first means to place the same under tension to frictionally hold said stop in adjusted position in said openings, and means on said stop for engagement by a tool to adjust said stop from the outside of the housing.

2. In a brake mechanism, a brake shoe and a support therefor, the combination of an adjustable screw stop for said brake shoe, a bracket supporting said stop secured to said support, a laterally extending rigid arm on said bracket and a depending member forming a continuation of said arm and spaced therefrom, said arm and member having threaded openings therethrough for receiving said stop, and a flexible connecting bend joining said arm and member affecting said member to frictionally hold said stop in adjusted position, said support having an opening adjacent said stop to facilitate adjustment of said stop.

3. In a brake mechanism, a brake shoe and a support therefor, the combination of an adjustable screw stop for said brake shoe, a bracket supporting said stop rigidly secured to said support, a laterally extending rigid arm on said bracket and a depending member forming a continuation of said arm and spaced therefrom, said arm and member having aligned threaded openings therein for receiving said stop, a connecting bend joining said arm and member having notches therein to permit flexure of the same and effective upon said member to frictionally maintain said stop in adjusted position in said openings.

In witness whereof, I hereunto subscribe my name this 22nd day of November, 1930.

WALLACE F. OLIVER.